United States Patent
Leboe et al.

(10) Patent No.: US 6,649,290 B2
(45) Date of Patent: Nov. 18, 2003

(54) FUEL CELL THERMAL MANAGEMENT SYSTEM AND METHOD

(75) Inventors: David Leboe, Vancouver (CA); Adrian J. Corless, New Westminster (CA)

(73) Assignee: Cellex Power Products, Inc., Richmond (CA)

( * ) Notice: Subject to any disclaimer, the term of this patent is extended or adjusted under 35 U.S.C. 154(b) by 266 days.

(21) Appl. No.: 09/854,409

(22) Filed: May 11, 2001

(65) Prior Publication Data

US 2002/0168556 A1 Nov. 14, 2002

(51) Int. Cl.[7] .................................................. H01M 8/00
(52) U.S. Cl. .............................. 429/13; 429/17; 429/20; 429/22; 429/24; 429/26
(58) Field of Search ............................... 429/13, 17, 20, 429/22, 24, 26

(56) References Cited

U.S. PATENT DOCUMENTS

| | | | |
|---|---|---|---|
| 4,578,324 A | 3/1986 | Koehler et al. | 429/26 |
| 4,670,702 A | 6/1987 | Yamada et al. | 320/21 |
| 4,706,737 A | 11/1987 | Taylor et al. | 165/47 |
| 4,839,246 A | 6/1989 | Takabayashi | 429/12 |
| 4,839,574 A | 6/1989 | Takabayashi | 320/3 |
| 4,883,724 A | 11/1989 | Yamamoto | 429/23 |
| 4,931,947 A | 6/1990 | Werth et al. | 364/492 |
| 4,961,151 A | 10/1990 | Early et al. | 364/492 |
| 4,962,462 A | 10/1990 | Fekete, deceased | 364/492 |
| 5,075,813 A | 12/1991 | Takabayashi | 361/84 |
| 5,139,894 A | 8/1992 | Mizuno et al. | 429/9 |
| 5,141,826 A | 8/1992 | Bohm et al. | 429/120 |
| 5,332,630 A | 7/1994 | Hsu | 429/20 |
| 5,334,463 A | 8/1994 | Tajima et al. | 429/9 |
| 5,458,095 A | 10/1995 | Post et al. | 123/3 |
| 5,470,671 A | 11/1995 | Fletcher et al. | 429/26 |
| 5,601,936 A | 2/1997 | Dudfield et al. | 429/13 |

(List continued on next page.)

FOREIGN PATENT DOCUMENTS

| | | |
|---|---|---|
| JP | 60254568 | 12/1985 |
| JP | 61233978 | 10/1986 |
| JP | 07006777 | 1/1995 |
| JP | 090222709 | 1/1997 |
| WO | WO 00/54354 | 9/2000 |
| WO | WO 02/067346 A2 | 8/2002 |

*Primary Examiner*—Bruce F. Bell
(74) *Attorney, Agent, or Firm*—Oyen Wiggs Green & Mutala

(57) ABSTRACT

This application relates to a system and method for regulating the temperature of a self-contained fuel cell apparatus preferably comprising a fuel reformer. The invention maintains the various components of the fuel cell apparatus within preferred operating temperature ranges while ensuring that exhaust gases and external surfaces of the apparatus do not exceed safe temperature levels. The invention is particularly suited for self-contained hybrid power supply applications, for example for non-road electric vehicles. The various components of the apparatus are strategically configured relative to air flow paths to fully utilize the cooling capacity of the process stream and minimize parasitic loads. In some embodiments the inlet air is pre-heated to enable operation of the apparatus in low temperature environments, such as industrial freezers.

24 Claims, 8 Drawing Sheets

U.S. PATENT DOCUMENTS

| | | | |
|---|---|---|---|
| 5,623,194 A | 4/1997 | Boll et al. | 320/15 |
| 5,631,532 A | 5/1997 | Azuma et al. | 320/5 |
| 5,645,952 A | 7/1997 | Lampinen et al. | 429/25 |
| 5,710,699 A | 1/1998 | King et al. | 363/132 |
| 5,714,874 A | 2/1998 | Bonnefoy | 323/299 |
| 5,760,488 A | 6/1998 | Sonntag | 307/10.1 |
| 5,773,160 A | 6/1998 | Wilkinson et al. | 429/13 |
| 5,780,980 A | 7/1998 | Naito | 318/139 |
| 5,820,172 A | 10/1998 | Brigham et al. | 290/40 |
| 5,929,595 A | 7/1999 | Lyons et al. | 320/104 |
| 5,945,808 A | 8/1999 | Kikuchi et al. | 320/132 |
| 5,980,726 A * | 11/1999 | Moulthrop, Jr. et al. | 429/24 |
| 5,991,670 A | 11/1999 | Mufford et al. | 701/22 |
| 6,011,379 A | 1/2000 | Singh et al. | 320/132 |
| 6,080,502 A | 6/2000 | Nölscher | 429/34 |
| 6,214,484 B1 | 4/2001 | Hauer | 429/9 |
| 6,344,289 B2 * | 2/2002 | Dekker et al. | 429/26 |
| 6,355,368 B1 * | 3/2002 | Kralick | 429/26 |
| 6,368,737 B1 * | 4/2002 | Margiott et al. | 429/26 |
| 6,534,950 B2 * | 3/2003 | LeBoe | 320/104 |
| 6,551,734 B1 * | 4/2003 | Simpkins et al. | 429/26 |
| 6,559,621 B2 * | 5/2003 | Corless et al. | 320/103 |
| 6,572,995 B2 * | 6/2003 | Yang et al. | 429/26 |

* cited by examiner

FUEL CELL THERMAL MANAGEMENT SYSTEM AND METHOD

TECHNICAL FIELD

This application relates to a system and method for regulating the temperature of a self-contained fuel cell apparatus preferably comprising a fuel reformer. The invention maintains the various components of the fuel cell apparatus within preferred operating temperature ranges while ensuring that exhaust gases and external surfaces of the apparatus do not exceed safe temperature levels. The invention is particularly suited for self-contained hybrid power applications.

BACKGROUND

Fuel cell systems, particularly those comprising fuel processors, generate significant heat at elevated temperatures. For example, conventional methanol reformers operate at temperatures on the order of 400° C. In order maximize the efficiency of the reforming and electrochemical processes, and the useful life of system components, the excess heat must be effectively extracted and dissipated. Operating fuel cell systems efficiently in very cold ambient temperature environments poses other thermal management challenges, particularly in the case of hybrid systems comprising temperature sensitive storage batteries.

In most fuel cell systems the component parts are liquid-cooled. Such conventional systems require the use of conduits to direct coolant into thermal contact with the fuel cells. The fuel cell stack usually includes a manifold and inlet for directing coolant fluid, typically water, to the interior of the stack to absorb heat generated by the exothermic reaction of hydrogen and oxygen within the fuel cells. In many cases heat extracted from the system is transferred to a thermal load for co-generation purposes.

U.S. Pat. No. 4,578,324, Koehler et al., issued Mar. 25, 1986 typifies prior art fluid cooled systems. The cooling system comprises cooling panels arranged adjacent to the electrochemical cells of a fuel cell stack. The cooling fluid may be circulated through a heat exchanger for disposing of excess heat before returning the fluid to a pump. The pump and heat exchanger are located external to the fuel cell.

U.S. Pat. No. 4,706,737, Taylor et al., issued Nov. 17, 1987, similarly discloses a fuel cell coolant inlet manifold and system including cooling plates disposed in the fuel cell stack. Cooling water is delivered to the stack through a manifold which communicates with the cooling plates. An outlet manifold and means for circulating the water through a coolant loop are also described. In U.S. Pat. No. 6,080,502, Nolscher et al., issued Jun. 27, 2000, a fluid-cooled fuel cell system is described comprising strategically positioned coolant distribution ducts to achieve uniform cooling of the fuel cell stack.

Some air-cooled fuel cell systems are known in the prior art, particularly in the case of low power applications. U.S. Pat. No. 5,470,671, Fletcher et al., issued Nov. 28, 1995, describes an electrochemical fuel cell employing ambient air as the oxidant and coolant. The fuel cell assembly may include a fan for directing ambient air onto the exposed surface of the cathode. The heat generated in the assembly is dissipated to the atmosphere through a thermally conductive plate. U.S. Pat. No. 5,645,952, Lampinen et al., issued Jul. 8, 1997, similarly discloses means for cooling a fuel cell assembly by circulating air between the electrochemical cells.

Prior art air-cooled fuel cell systems typically comprise air conducting channels for dissipating waste heat from the fuel cell to the environment in a direct fashion. The prior art does not address the problem of circulating air streams relative to other system components, such as the components of a hybrid power supply arrangement, in the most efficient manner to best utilize the cooling capacity of the air and minimize parasitic loads.

Functionally self-contained fuel cell systems pose particular design challenges. By way of example, the applicant has developed a hybrid power supply apparatus particularly adapted for battery replacement applications which may be used to power non-road electric vehicles, such as lift trucks, sweepers and scrubbers and ground support equipment. The hybrid apparatus may be substituted for conventional traction batteries in a "plug and play" manner without requiring any modification to the electric vehicle, or other load having relatively low power requirements. The apparatus is effectively self-contained since the only interface with the electrical vehicle is by way of a standard electrical DC connection (e.g. no inlets or outlets for circulating liquid coolant derived from the vehicle or some other external source are provided). Moreover, in order to ensure plug and play functionality and avoid the need for vehicle modification, no thermal load is available for transfer to the vehicle. Consequently all heat transfer must be with the surrounding environment only. Further, due to the proximity of the vehicle operator to the hybrid power supply apparatus during normal operation of the vehicle, ergonomic considerations require that the temperature of the exhaust gas stream and the external surfaces of the apparatus remain below safe thresholds.

The need has accordingly arisen for a system and method for regulating the temperature of a self-contained fuel cell apparatus, such as a hybrid power supply for battery replacement applications, which is constrained to operate within a small physical space. The invention maintains the various heat-generating components of the fuel cell apparatus within preferred operating temperature ranges while ensuring that exhaust gases and external surfaces of the apparatus do not exceed safe temperature levels.

SUMMARY OF INVENTION

In accordance with the invention, a method of regulating the thermal characteristics of a self-contained fuel cell apparatus is described. The apparatus may comprise, for example, a hybrid power supply apparatus having external surfaces and a plurality of heat-generating components housed within the apparatus, each of the components having different preferred operating temperature ranges. The method comprises the steps of:

(a) introducing a heat transfer gas into the apparatus;

(b) moving the heat transfer gas within the apparatus in one or more flow paths between the components to maintain the components within the preferred operating temperature ranges, whereby the flow paths are configured such that the heat transfer gas has sufficient cooling capacity to accept waste heat from each of the components located downstream therefrom; and (c) exhausting the gas from the apparatus to the environment surrounding the apparatus, wherein the temperature of the external surfaces and the gas exhausted from the apparatus is maintained below 70° C.

Preferably the method involves the use of multiple flow paths and the step of transferring heat from heat transfer gas moving through a first one of the flow paths to heat transfer gas moving through a second one of the flow paths. At least some of the flow paths are preferably merged prior to exhausting the heat transfer gas from the apparatus. In one embodiment at least some of the heat transfer gas is recirculated within the apparatus to pre-heat the intake air.

In a preferred embodiment the heat transfer gas is air introduced into the apparatus through an inlet in communication with the environment. In one embodiment the air is introduced into the apparatus through a single inlet and exhausted from the apparatus through a single outlet. Preferably the air is exhausted at a temperature below 50° C.

The various components of the apparatus may comprise a fuel cell, a fuel processor, such as a reformer, a DC/DC converter and an energy storage device, such as a battery. In this embodiment the method may comprise the steps of:

(a) moving the heat transfer gas in a first one of the flow paths from the inlet past the energy storage device and the DC/DC converter;

(b) moving the heat transfer gas in a second one of the flow paths from the inlet through the reformer; and (c) moving the heat transfer gas in a third one of the flow paths from the inlet through the fuel cell.

The invention may further comprise the step of mixing the heat transfer gas from the second and third flow paths downstream from the reformer to dilute exhaust expelled from the reformer. Preferably the recirculated air does not contain any reformer exhaust. Advantageously, some heat from the heat transfer gas may be transferred to a fuel storage chamber of the apparatus.

In one arrangement, the heat transfer gas is moved through the first flow path downstream from the DC/DC converter to accept radiant heat from the reformer. The method includes the step of transferring heat from the heat transfer gas to a source of fuel for the apparatus prior to introduction of the fuel into the reformer. The heat transfer gas moving in the third flow path may comprise oxidant gas reacted in the fuel cell.

BRIEF DESCRIPTION OF DRAWINGS

In drawings which illustrate embodiments of the invention but which should not be construed as restricting the spirit or scope of the invention in any way.

DESCRIPTION OF INVENTION

Figure 1:
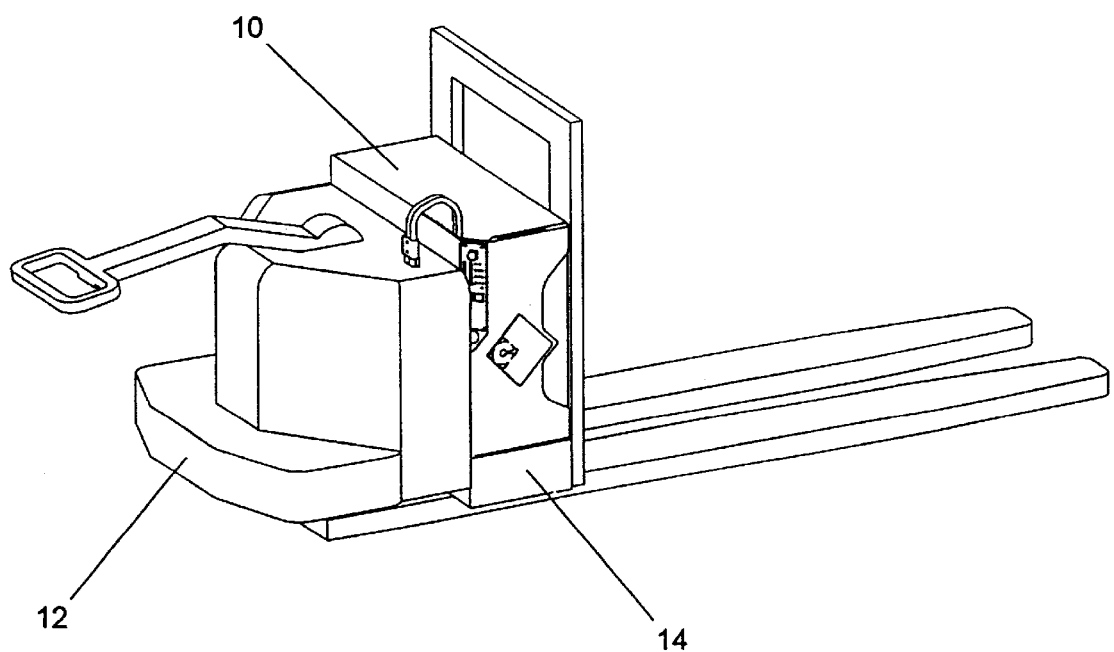
FIG. 1 is a rear isometric view of a lift truck fitted with a hybrid power supply apparatus.

The applicant has developed a hybrid power supply apparatus 10 for use in non-road electric vehicles, such as lift trucks 12. Apparatus 10 is a substitute for conventional lead acid traction batteries and is sized to fit within a battery receptacle tray 14 of lift truck 12 as illustrated in FIG. 1. Apparatus 10 is described in detail in applicant's co-pending application Ser. No. 09/785,878 filed Feb. 16, 2001, the text and drawings of which are incorporated herein by reference.

Figure 2:
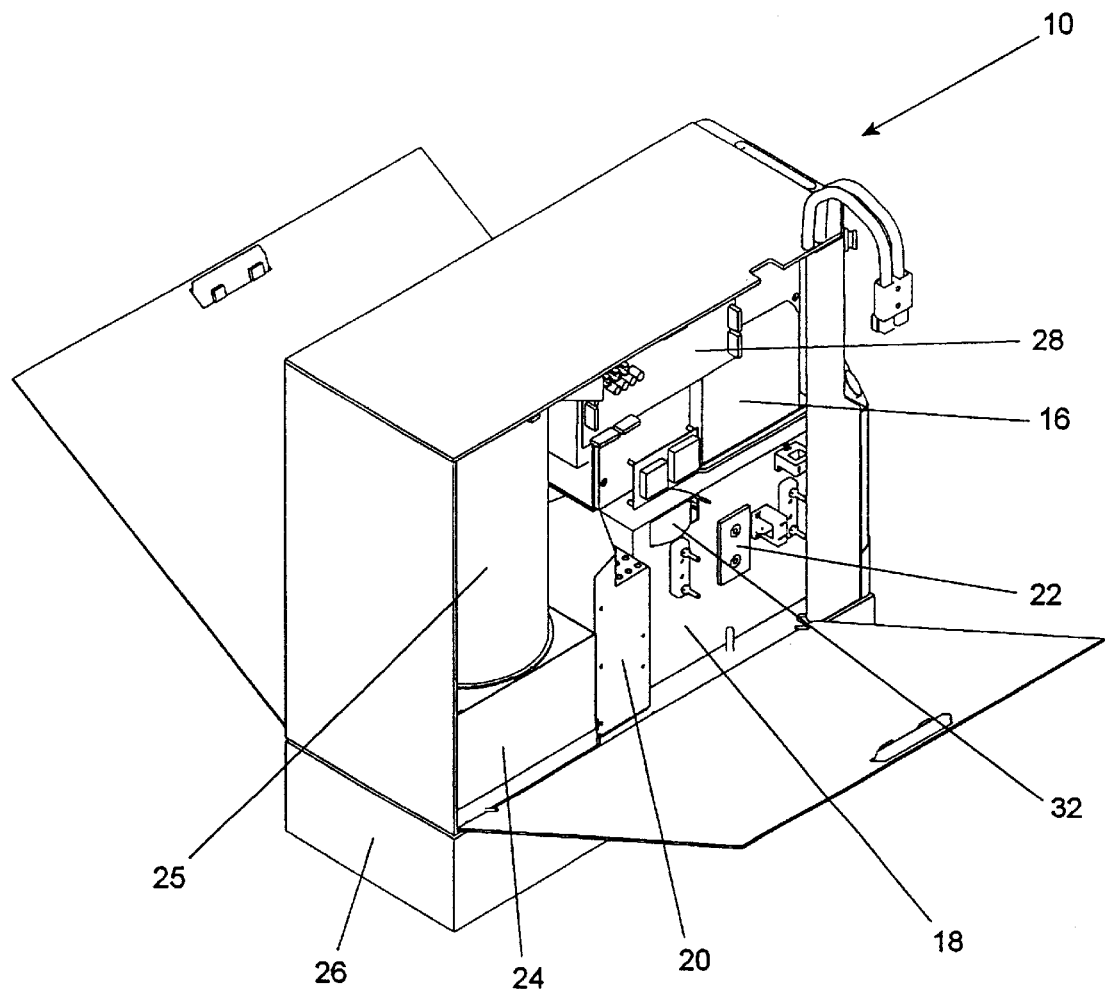
FIG. 2 is an isometric view of one particular embodiment of the apparatus of FIG. 1 using liquid fuel and showing side panels of the apparatus in an open position to expose internal components.

One particular embodiment of the applicant's apparatus 10 using liquid fuel is illustrated in FIG. 2. Apparatus 10 is "hybrid" in character since it includes both a fuel cell 16 to generate power and an energy storage means, such a storage battery 18, which is connectable to the drive system of truck 12 or some other load. Apparatus 10 has been engineered so that it is transparently interchangeable with a conventional traction battery in a "plug and play" manner without requiring any modification to truck 12. More particularly, apparatus 10 has substantially the same shape, dimensions, weight and electrical interface as a conventional traction battery. This enables apparatus 10 to be easily inserted into or removed from an existing battery tray 14 and used in the same manner as a conventional traction battery.

Hybrid power supply apparatus 10 is also suitable for non-vehicular low power applications where the size of the power supply is limited by size or geometric constraints. For example, apparatus 10 may be used for on/off grid power generation, recreational power use, uninterruptible power supply and other conventional battery replacement applications.

While hybrid fuel cell/battery power systems are of course well known in the prior art, the integration of a self-contained system within a small geometric space (e.g. an enclosure capable of fitting within the dimensions of a standard traction battery tray 14) poses multiple design challenges. Optimal thermal management of apparatus 10 is of particular importance in such applications. Fuel cell systems, particularly those with associated fuel processors, generate significant waste heat. In many cases hybrid power systems are operated outdoors or in applications having a fixed outdoor exhaust (e.g. automobiles or home power systems). However, lift trucks 12 and the like, which are often operated indoors, are constrained to emit low temperature exhaust only. In order to avoid operator injury, it is important that the external surfaces of hybrid power apparatus 10 be maintained at a low temperature. Further, it is equally important that a significant amount of heat not be transferred from apparatus 10 to the body of truck 12 (i.e. all excess heat should preferably be transferred to the environment rather than placing additional thermal loads on associated equipment, such as truck 12). Optimum thermal regulation also enables hybrid power apparatus 10 to be used in a wide range of ambient temperatures typically serviced by trucks 12, including sub-freezing refrigerated environments as would be encountered in industrial freezer lockers and the like.

Figure 3:
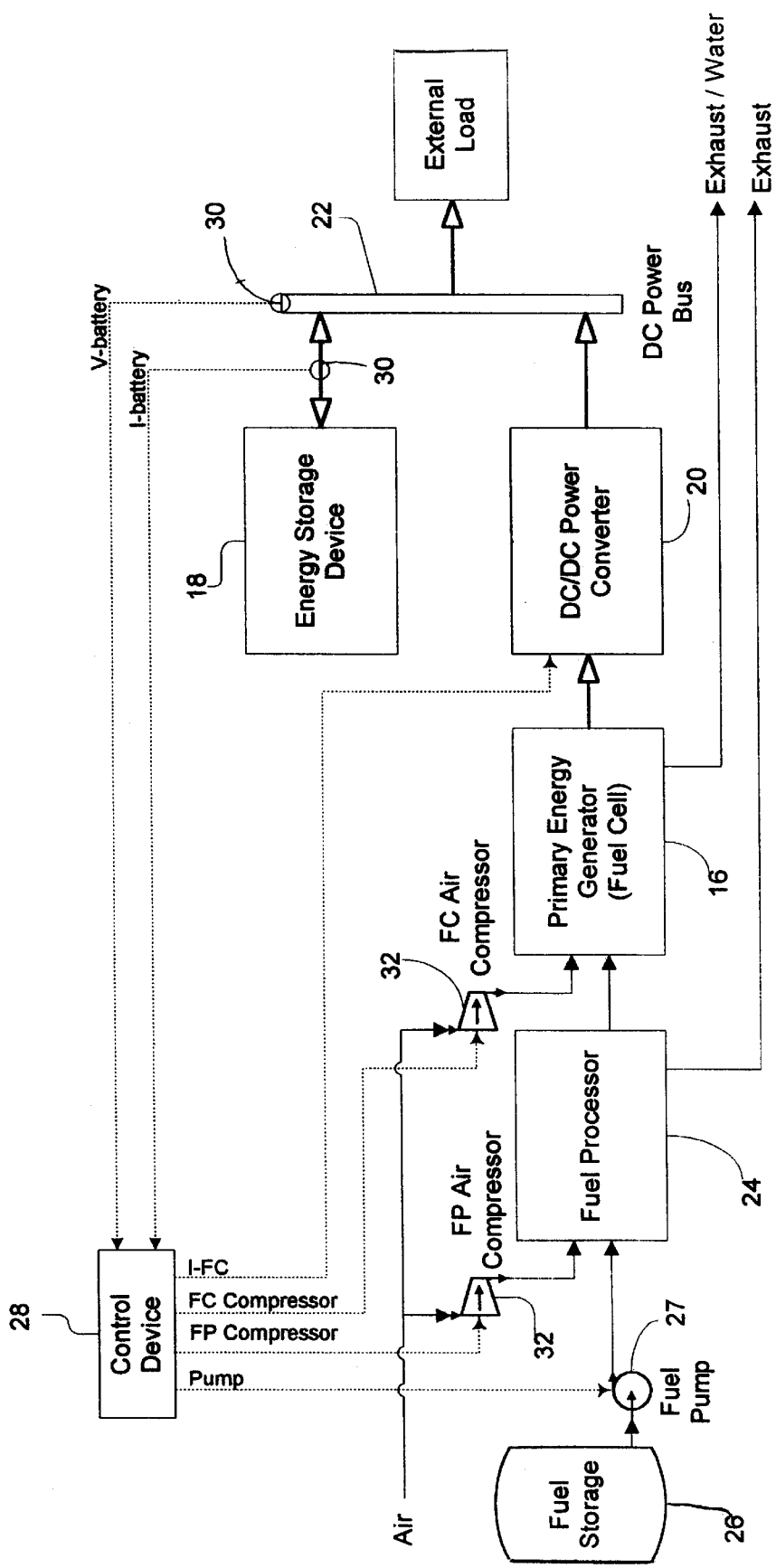
FIG. 3 is a schematic diagram showing the hybrid fuel cell/battery architecture of the hybrid power supply apparatus of FIG. 1.

FIG. 3 illustrates schematically the general architecture of apparatus 10 showing the various hybrid components which require thermal management to varying degrees. As mentioned above, apparatus 10 includes a fuel cell 16 and at least one storage battery 18 or other energy storage device, such as a capacitor. Fuel cell 16 delivers raw DC current to a DC/DC converter 20. Battery 18 is connected to the DC/DC converter 20 via a DC bus 22 for storing at least part of the conditioned DC current outputted by converter 20. Battery 18 is electrically coupled to DC bus 22 for delivering electrical energy to a load, such as the drive system of a lift truck 12, via a conventional DC electrical interface.

Hybrid power supply apparatus 10 may employ various types of fuels, including readily available fuels such as methanol and propane (LPG). In such cases, apparatus 10 includes a fuel processor, such as a reformer 24, for converting raw fuel to substantially pure hydrogen suitable for use by fuel cell 16. Reformer 24 is coupled to fuel storage chamber 26 with suitable fuel lines. A computer controller 28, which receives input from various voltage and current sensors 30, controls charging of battery 18 by fuel cell 16.

Since apparatus 10 is self-contained (apart from the standard DC electrical interface providing power to truck 12 or some other load) it is preferably air-cooled. This ensures that all necessary heat transfer is with the surrounding environment only when apparatus 10 is in operation. Accordingly, even if some of the components of the system are themselves cooled by other means, such as liquid cooling, the waste heat generated by apparatus 10 as a whole is preferably dissipated to the environment using air as the heat transfer medium. In the case of low power fuel cell applications, cooling of the fuel cell stack may be done directly using ambient air to minimize the need for additional heat exchange sub-systems within the overall system. As used in this patent application the term "self-contained" means that apparatus 10 is housed within a discrete physical space and is constrained to transfer its thermal load to the surrounding environment only. In other words, apparatus 10 is not thermally integrated with the load or any other external system with which it is operatively connected.

As described further below, apparatus 10 includes strategically positioned fan blowers 32 for circulating air through flow paths within apparatus 10 to: (a) maintain the temperature of each hybrid component within a preferred temperature range; (b) ensure that the temperature of the external surfaces of apparatus 10 and exhaust air streams are below safe thresholds; and (c) dilute potentially harmful exhaust gases prior to expulsion from apparatus 10. The operation of blowers 32 may also be regulated by controller 28. The blowers 32 which regulate the thermal characteristics of apparatus 10 supplement the conventional air pumps or blowers 32 which supply reactants to fuel cell 16 and reformer 24 (FIG. 3).

Figure 4:
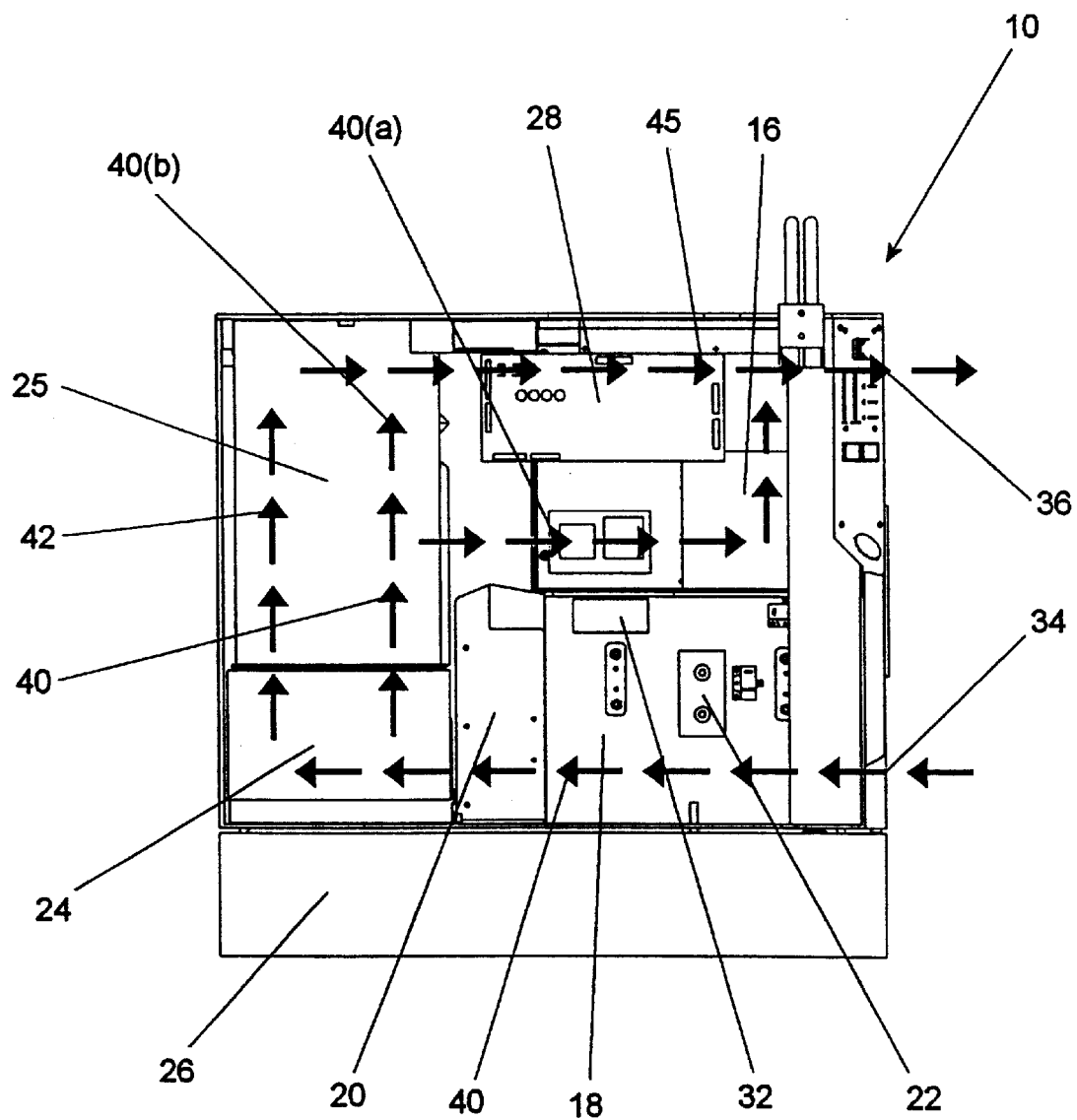
FIG. 4 is a side elevational view of the apparatus of FIG. 3 with a side panel removed and showing exemplary air flow paths.

FIG. 4 illustrates generally one possible arrangement for circulating air (or some other suitable heat transfer gas) through apparatus 10. In the illustrated embodiment air is drawn into apparatus 10 through an inlet 34 by the operation of at least one blower 32. The inlet air is passed over the surface of battery 18 and DC/DC power converter 20. As described further below, the incoming air may be separated into a first air stream 40 which is passed through reformer shroud 25 to accept radiant heat generated by the reforming process and a second air stream 42 which is conveyed directly to reformer 24 to provide a supply of burner air. The first air stream may be further subdivided into a substream 40(a) which is circulated past fuel cell 16 and a second substream 40(b) which is used to dilute and cool the reformer exhaust. The various air streams and substreams are then merged at strategic locations within apparatus 10 and expelled through an outlet 36.

Figure 5:
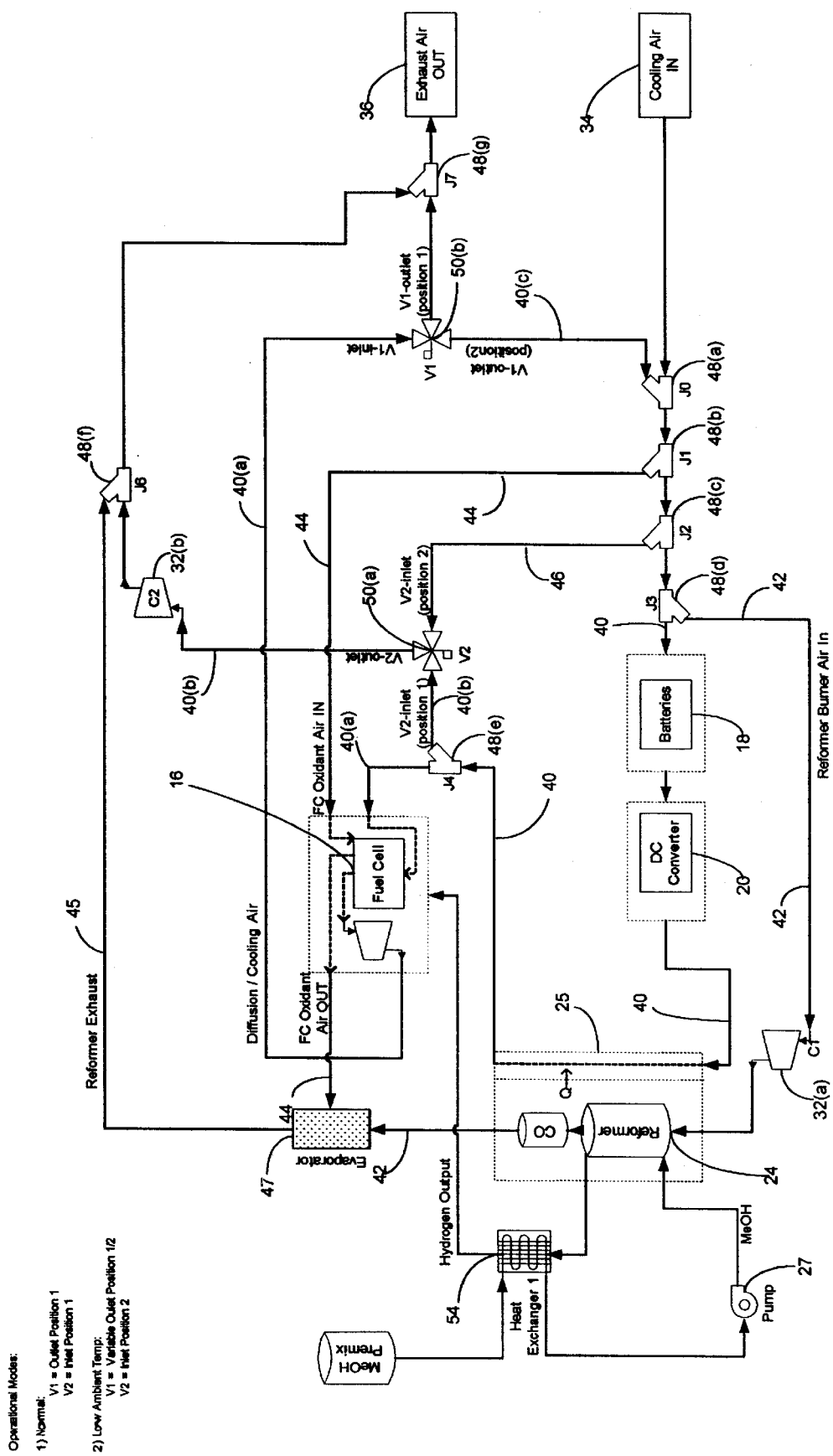
FIG. 5 is a schematic diagram of one possible arrangement for air cooling of the hybrid power supply apparatus of FIG. 1.

FIG. 5 illustrates schematically a preferred air cooling system of applicant's invention in further detail. In order to achieve optimum efficiency, the various components of apparatus 10 are geometrically ordered relative to air flow paths based on temperature limits and sensitivity. Preferably the coolant air is reused as much as possible to minimize total air flow. Further, since apparatus 10 is designed for low power applications, such as non-road electrical vehicles, it is important to minimize flow impedances and electrical parasitic loads associated with the cooling system. In the preferred arrangement of FIG. 5, incoming air passing through inlet 34 is divided into three separate first, second and third air streams 40,42 and 44. The inlet air may also optionally be diverted into a fourth air stream 46 in the case of low temperature applications as described further below. As shown in FIG. 5, a plurality of junctions 48(a)–(g) and adjustable valves 50(a)–(b) are preferably provided for strategically dividing and merging the air streams. Apparatus 10 thus includes a combination of both active air flow control means, such as blowers 32(a)–(b) and valves 50(a)–(b), and passive flow control means, such as junctions 48(a)–(g).

In a normal operating mode (i.e. at normal ambient temperatures) the incoming air passing through inlet 34 is subdivided into air streams 40,42 and 44 at junctions 48(b) and 48(d). First air stream 40 is initially passed over battery 18 and DC/DC power converter 20. Both of the above components are relatively sensitive to temperature fluctuations and should be maintained at relatively cool operating temperatures for best performance. In the case of low ambient temperatures, at least some of the inlet air may be pre-heated with heated exhaust air as discussed further below to protect battery 18 and DC/DC power converter 20 from excessively cold temperatures.

After passing over converter 20, first air stream 40 is diverted through a shroud 25 surrounding reformer 24 to accept radiant heat generated by the reforming process. Reformers 24 typically operate at very high temperatures (i.e. on the order of 400° C.). A first substream 40(a) of air stream 40 is then diverted at a junction 48(e) to fuel cell 16 to maintain fuel cell 16 at a desirable operating temperature (i.e. within the range of approximately 60–80° C.). A second substream 40(b) of air stream 40 bypasses fuel cell 16 and is used to dilute the exhaust air stream as described further below.

As illustrated in FIG. 5, the second and third air streams 42, 44 may be circulated directly to reformer 24 and fuel cell 16 respectively. Second air stream 42, which constitutes the burner air, is exhausted from reformer 24 at a high temperature and is merged with air stream 44 in an evaporator 47 located downstream from reformer 24 to form an exhaust air stream 45. Air stream 44 delivers oxidant air to fuel cell 16 and contains water when expelled from fuel cell 16. The hot air present in air stream 42 evaporates the water content of air stream 44 in evaporator 47, thereby cooling the merged exhaust stream 45 and maintaining it in a vapour state suitable for expulsion to the environment.

As shown in FIG. 5, a heat exchanger 54 is preferably provided to cool the hydrogen gas generated by reformer 24 to ambient or near-ambient temperature upstream from fuel cell 16 and to pre-heat the fuel (e.g. methanol) before the fuel is pumped to reformer 24.

In the normal operating mode of the applicant's air cooling system, valve 50(a) is inlet position 1 and valve 50(b) is in outlet position 1 (FIG. 5). In this normal mode, first substream 40(a) and second substream 40(b) are combined with exhaust air stream 45 (resulting from mixture of air streams 42 and 44) at junctions 48(f) and 48(g) located downstream from reformer 24. Substream 40(b), which is relatively cooler than substream 40(a) since it has not passed through fuel cell 16, reduces the temperature of exhaust stream 45 to a safe temperature (e.g. below 70° C. and preferably below 50° C.) before it is discharged through outlet 36. Substreams 40(a) and 40(b) also serve to dilute the carbon monoxide content present in exhaust stream 45 prior to its expulsion to the environment.

In an alternative operating mode suitable for low temperature operation, valve 50(a) is in inlet position 2 and valve 50(b) is in a variable outlet position whereby a portion of the air coolant is expelled and a portion is recirculated as described below. In this alternative operating mode, first air stream 40 is not divided into first and second substreams 40(a) and 40(b) (since valve 50(a) is in inlet position 2). Rather, all of air stream 40 passes through fuel cell 16. In this mode air stream 40 is subdivided downstream from fuel cell 16 at adjustable valve 50(b). A substream 40(c) of air stream 40 is recirculated to pre-heat the incoming air drawn through inlet 34. The remaining portion of air stream 40 is mixed with exhaust stream 45 at junction 48(g) before it is expelled through outlet 36.

In the low temperature operational mode of the applicant's air cooling system, the inlet air may be further divided at a junction 48(c) into an air stream 46 for merging with reformer exhaust stream 45 at junction 48(f) (FIG. 5). An important feature of this arrangement is that the recycled portion of the heated air, namely substream 40(c), does not contain any reformer exhaust gases. This avoids the problem of reformer emissions that would otherwise build in concentration within apparatus 10 if re-circulated.

Pre-heating of inlet air as described above allows system components with minimum operating temperature thresholds, such as fuel cell 16 and battery 18, to operate in environments where the ambient temperature is below the threshold temperature. Inlet air pre-heating may be required, for example, in an industrial freezer environment where ambient temperatures of between −20° C. to −40° C. are commonplace. In these environments a thermally regulated system would outperform conventional battery technology which does not operate well at low temperatures. Inlet air pre-heating may be accomplished directly by recirculating a portion of the system exhaust directly as described above (preferably a "clean" portion to avoid concentration of emissions). An alternative approach would be to indirectly pre-heat the inlet air with the warm exhaust air by means of a heat exchanger. In this case there would be no re-circulation of exhaust air. However, the drawback to this approach is that air-to-air heat transfer is very inefficient and hence a large heat exchanger would be required for many low temperature applications.

Some embodiments of applicant's hybrid power supply apparatus 10 comprise pressurized fuel storage chambers as described in applicant's co-pending application Ser. No. 09/785,878. In the case of such pressurized fuels (e.g. LPG or hydrogen), fuel delivery requirements often exceed the storage pressure of the containment chamber. In this case the waste heat from the overall system can be used to heat the fuel tank thereby increasing the feed pressure to the desired level (which would otherwise be achieved by a mechanical pump). Thermal regulation of the tank or tank chamber could be accomplished according to the principles outlined herein.

The exemplary air flow patterns described above preferably under the control of microprocessor controller 28 which receives input from various temperature and air flow sensors (not shown). In one embodiment of the invention, controller 28 may be programmed to periodically reverse the direction of air flow. This enables the periodic expulsion of built-up debris from the interior of apparatus 10 through air inlet 34. Air inlet 34 and outlet 36 may also include conventional grills or deflector shields to filter debris and ensure the exhaust gas stream is ergonomically located for operator comfort.

As will be apparent to a person skilled in the art, other equivalent means for flowing cooling gas streams through apparatus 10 may be envisaged for the purposes of:

(1) Maintaining exhaust streams and operator interfaces at safe temperatures and preventing transfer of thermal loads to other equipment.
(2) Maintaining various components of the hybrid power subsystem within a preferred temperature range for optimum performance and longevity.
(3) Controlling the thermal status of different component parts precisely and independently.
(4) Enabling operation of electric vehicles at a wide range of ambient temperatures.
(5) Dilution of exhaust gas constituents, such as carbon monoxide.
(6) Purging of waste materials.
(7) Minimizing parasitic electrical loads associated with the cooling system for improved performance.

The above objectives are achieved by strategically arranging components of the system at selected locations relative to a cooling air stream so that a single active air moving means, such as a blower, fan, pump or compressor 32, may be used to cool multiple components. The objective of series ordering is to fully utilize the cooling capacity of the process stream. Ordering of the components is done (from inlet to outlet) according to ascending allowable inlet air temperatures for the individual components. Thus, the heated air exhausted from one component will still have enough cooling capacity to effectively remove heat from downstream components within the same flow path.

By arranging components in such an ordered fashion they become functionally dependent. For example, if a single component is too warm and requires additional cooling air, all components in the stream will receive additional cooling air. Therefore, a further criteria for component ordering is that all components within a single air stream must have a similar sensitivity to cooling. Any specific changes in cooling air flow required by one component must therefore either benefit or not adversely affect the other components in the stream. For example, if a single component becomes too warm and air flow in the stream is increased, the excessive cooling of the upstream dependent components must not negatively affect their performance (note in this context "excessive" cooling means that the affected components will ordinarily approach the ambient environment temperature).

With reference to FIGS. 4 and 5, battery 18, DC/DC power converter 20 and reformer shroud 25 are strategically ordered relative to the flow path of cooling substream 40. If, for example, DC/DC converter 20 were to become too hot and required additional cooling air, battery 18 and reformer shroud 25 would indirectly benefit as additional cooling would bring them closer to their target operating temperature of near ambient. Similarly, if any other component required additional cooling, all components in the chain would benefit.

Incompatible components which can not be dependently ordered within a single air stream must be separated. This can be done by creating a network of parallel flow paths as shown in FIG. 5 within which components are separately ordered as described above. The simplest way to eliminate dependencies in this manner is for each parallel path to have an independent air control or air moving means and an associated single feedback point. Parallel paths may be split from series paths and recombined again in numerous possible configurations until all components can be thermally balanced and all interface temperature criteria can be satisfied. For example, as shown in FIG. 5, a single air stream 40 may be used to cool battery 18, DC power converter 20 and reformer shroud 25. A parallel air stream 42 may be split from air stream 40 at junction 48(d) for directing a separate air stream to reformer 24. Similarly, air stream 40 may be split at junction 48(e) into parallel substreams 40(a) and 40(b). Substream 40(a) is diverted to regulate the temperature of fuel cell 16 at higher operating temperatures and substream 40(b) is used to cool and dilute the reformer exhaust. The various air streams and substreams are merged downstream from fuel cell 16 so that the combined exit air discharged from outlet 36 is below a safe threshold temperature.

As will be apparent to a person skilled in the art, the volume and flow rate of air within a particular flow path can be controlled by different conventional means. In the case of active flow control, cooling air is pushed or pulled by a fan, compressor, pump or blower 32(a) or (b) or otherwise directed in some capacity by an active component. In the case of passive flow control, air streams are strategically divided and recombined or otherwise altered in some capacity by a passive element. For example, a parallel stream may receive a computed fraction of another flow by a flow constriction device, such as a junction 48(a)–(g) or a similar passive geometrical object. With the objective of minimizing parasitic loads on the overall system, preferred embodiments of the invention comprise flow networks that minimize the number of active elements. Since feedback points are only required for active elements, minimizing active elements also decreases system complexity and power consumption.

Figure 6:
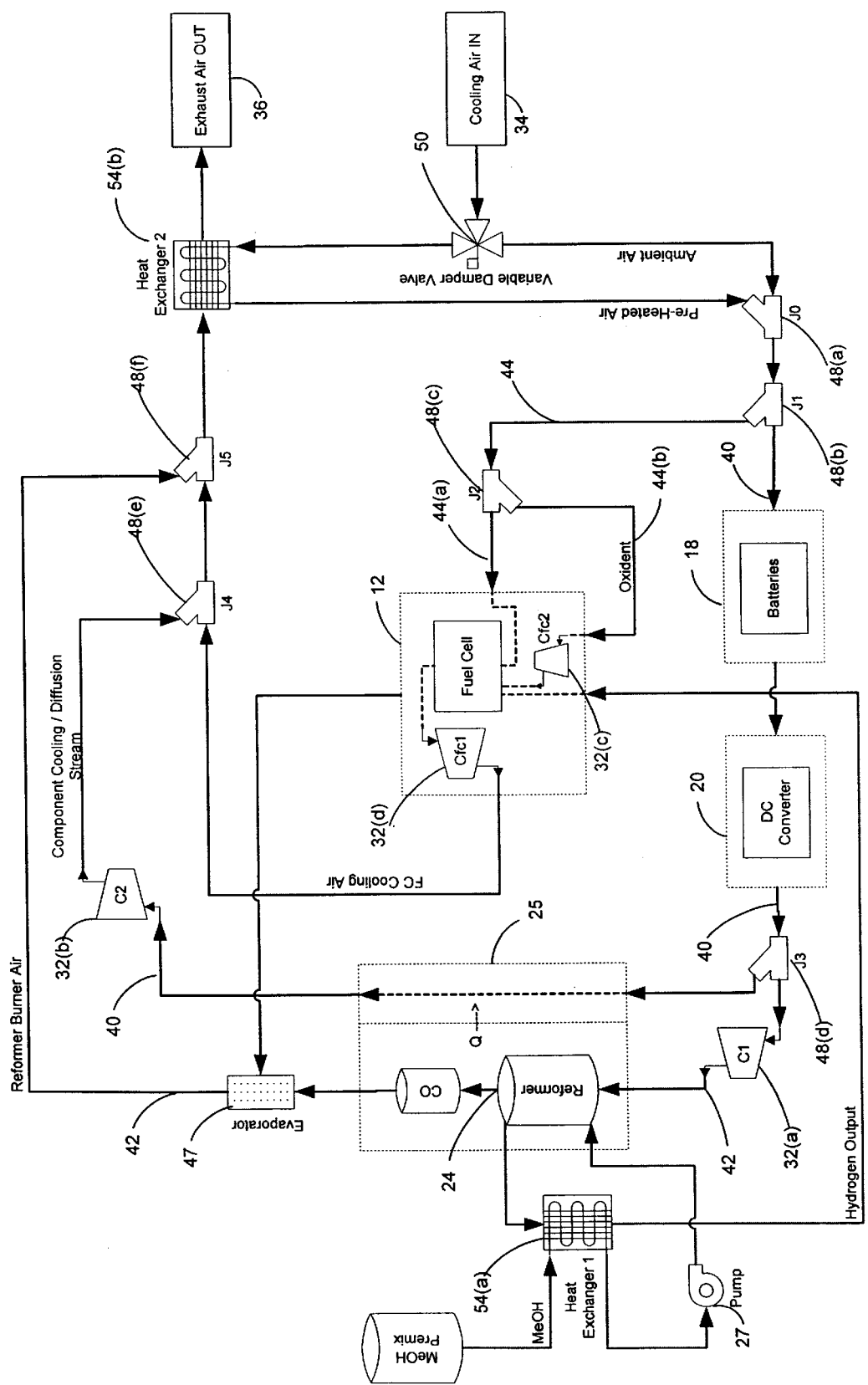
FIG. 6 is a schematic diagram of an alternative arrangement for air cooling the hybrid power supply apparatus of FIG. 1.

By way of further example, FIG. 6 illustrates schematically an embodiment of the invention showing an alternative airflow pattern. In the embodiment of FIG. 6 a second heat exchanger 54(b) is provided for pre-heating a portion of inlet air by transferring heat from warm exhaust gas. The relative proportions of pre-heated air and ambient air may be regulated by adjusting a variable damper valve 50 located at inlet 34. In this example, air stream 42, which is flowed through reformer 24, is divided from air stream 40 at a junction 48(d) downstream from DC/DC power converter 20 rather than upstream from battery 18. Air stream 44 is subdivided into a coolant air stream 44(a) and an oxidant air stream 44(b) at a junction 48(c) upstream from fuel cell 12. In this embodiment fuel cell 12 may comprise additional active flow control elements, such as air blowers or pumps 32(c) and 32(d), which are integral to the fuel cell stack.

Figure 7:
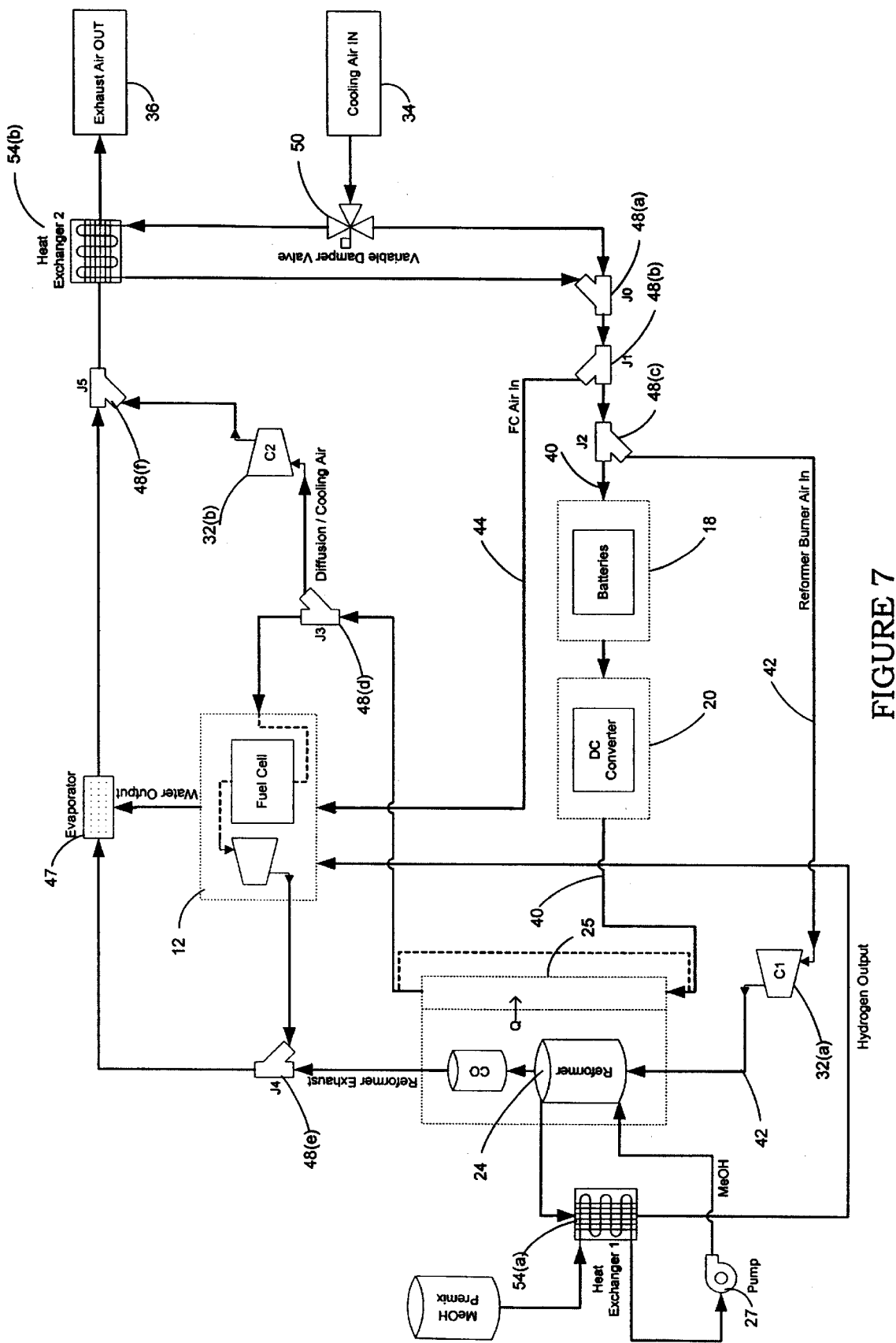
FIG. 7 is a schematic diagram of a further alternative arrangement for air cooling the hybrid power supply apparatus of FIG. 1.

FIG. 7 illustrates schematically a further alternative embodiment similar to the embodiment of FIG. 5 but including a second heat exchanger 54(b) for pre-heating the inlet air rather than employing direct air re-circulation.

Figure 8:
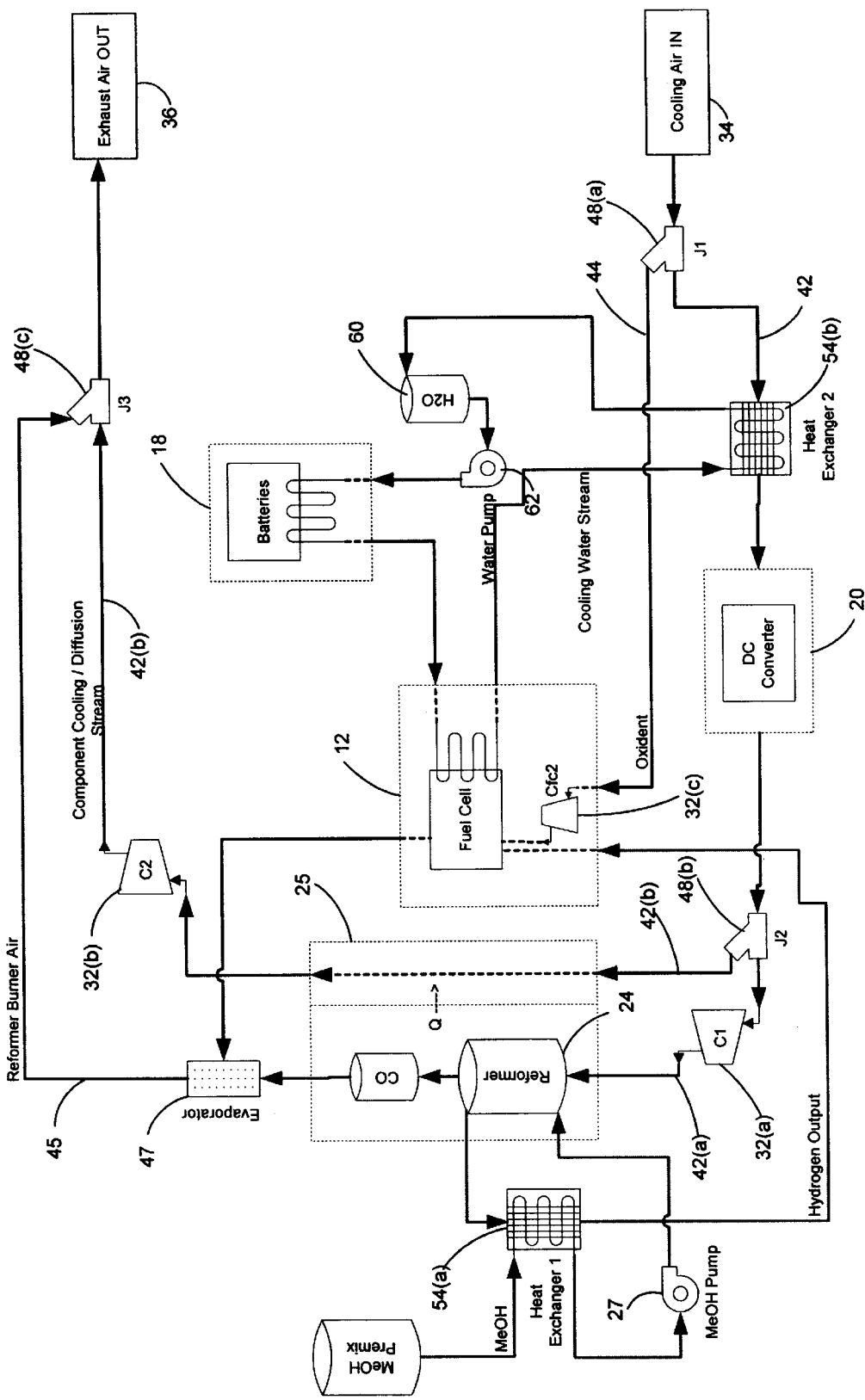
FIG. 8 is a schematic diagram of a still further alternative arrangement for air cooling the hybrid power supply apparatus of FIG. 1 wherein some of the internal components are liquid-cooled.

FIG. 8 illustrates schematically a still further alternative embodiment of the invention wherein some of the system components arranged within apparatus 10 are water-cooled. In this particular embodiment water from a water supply 60 is propelled by means of a water pump 62 to batteries 18 to maintain batteries 18 within their preferred temperature range. The water is next circulated to fuel cell 16 to absorb additional waste heat. The heated water is then passed through a heat exchanger 54(b) before being returned to water supply 60 to complete the cycle.

The thermal load is transferred in heat exchanger 54(b) from the water coolant to an inlet air stream 42. After passing through exchanger 54(b), air stream 42 is directed to DC/DC converter 22 and is then subdivided into substreams 42(a) and 42(b) which are conveyed to reformer 24 and reformer shroud 25 respectively in a manner similar to the other embodiments described above. Substream 42(a), which contains the reformer exhaust, is discharged from reformer 24 at a very hot temperature and is then merged with an oxidant air stream 44 in an evaporator 47 to form an exhaust air stream 45. As in the embodiments described above, the oxidant air stream 44 contains water when expelled from fuel cell 16. The hot air present in substream 42(a) evaporates the water content of substream 44 and maintains the merged exhaust stream 45 in a cooled vapour state. Exhaust stream 45 is then merged with substream 42(b) to further cool and dilute the reformer exhaust before it is discharged to the environment through exhaust outlet 36.

Although some components of the embodiment of FIG. 8 are internally water-cooled, all necessary heat transfer with the external environment is achieved using air as the sole heat transfer medium, as in the other embodiments described above. Accordingly, the apparatus of FIG. 8 is functionally self-contained and does not require connection to an external liquid coolant supply.

Many other possible alternative airflow layouts may be envisaged for managing the thermal characteristics of the system. As will be apparent to a person skilled in the art, the applicant's thermal management system described herein could find application in any self-contained fuel cell application, especially reformer-based systems. Although the various embodiments of the invention have been described in the context of a hybrid system having an energy storage means, this is not a critical feature of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of regulating the thermal characteristics of a self-contained fuel cell apparatus having external surfaces and a plurality of heat-generating components housed within said apparatus, said components having different preferred operating temperature ranges, said method comprising:

(a) introducing a heat transfer gas into said apparatus;

(b) moving said heat transfer gas within said apparatus in one or more flow paths between said components to maintain said components within said preferred operating temperature ranges, whereby said flow paths are configured such that said heat transfer gas has sufficient cooling capacity to accept waste heat from each of said components located downstream therefrom; and (c) exhausting said gas from said apparatus to the environment surrounding said apparatus, wherein the temperature of said external surfaces and said gas exhausted from said apparatus is maintained below 70° C.

2. The method of claim 1, further comprising the step of transferring heat from said heat transfer gas moving through a first one of said flow paths to said heat transfer gas moving through a second one of said flow paths.

3. The method of claim 1, wherein said method comprises providing a plurality of said gas flow paths and further comprises merging at least some of said flow paths prior to exhausting said heat transfer gas from said apparatus.

4. The method of claim 1, wherein at least some of said heat transfer gas is recirculated within said apparatus.

5. The method of claim 1, wherein an exhaust portion of said heat transfer gas is recirculated to pre-heat an intake portion of said heat transfer gas at a location upstream from at least some of said components, wherein said exhaust portion does not comprise contaminated emissions.

6. The method of claim 1, further comprising transferring heat from said heat transfer gas to a fuel storage chamber of said apparatus.

7. The method of claim 1, wherein said heat transfer gas is air introduced into said apparatus through an inlet in communication with said environment.

8. The method of claim 7, wherein said components comprise a fuel cell, a reformer, a DC/DC converter and an energy storage device, said method further comprising:

(a) moving said heat transfer gas in a first one of said flow paths from said inlet past said energy storage device and said DC/DC converter;

(b) moving said heat transfer gas in a second one of said flow paths from said inlet through said reformer; and (c) moving said heat transfer gas in a third one of said flow paths from said inlet through said fuel cell.

9. The method of claim 8, further comprising mixing said heat transfer gas from said second and third flow paths downstream from said reformer to dilute exhaust expelled from said reformer.

10. The method of claim 8, wherein said heat transfer gas is moved through said first flow path downstream from said DC/DC converter to accept radiant heat from said reformer.

11. The method of claim 8, further comprising transferring heat from said heat transfer gas to a source of fuel for said apparatus prior to introduction of said fuel into said reformer.

12. The method of claim 8, wherein said heat transfer gas is introduced into said apparatus through a single inlet and is exhausted from said apparatus through a single outlet.

13. The method of claim 8, wherein said heat transfer gas moving in said third flow path comprises oxidant gas reactedin said fuel cell.

14. The method of claim 1, wherein the temperature of said external surfaces and said gas exhausted from said apparatus is maintained below 50° C.

15. A system for regulating the thermal characteristics of a self-contained fuel cell apparatus having external surfaces and a plurality of heat-generating components housed within said apparatus, said components having different preferred operating temperature ranges, said system comprising:

(a) an inlet for introducing a heat transfer gas into said apparatus;

(b) means for moving said heat transfer gas within said apparatus in one or more flow paths between said components to maintain said components within said preferred operating temperature ranges, whereby said flow paths are configured such that said heat transfer gas has sufficient cooling capacity to accept waste heat from any of said components located downstream therefrom; and (c) an outlet for exhausting said gas from said apparatus to the environment surrounding said apparatus, wherein the temperature of said external surfaces and said gas exhausted from said apparatus is maintained below 70° C.

16. The system of claim 15, wherein said heat transfer gas is air introduced into said apparatus from the environment surrounding said apparatus through said inlet.

17. The system of claim 14, wherein said means for moving said heat transfer gas through said apparatus comprises:

(a) a plurality of conduits within said apparatus defining said flow paths for holding volumes of said heat transfer gas, each of said conduits being in communication with said inlet and said outlet;

(b) a plurality of air diverters for diverting said heat transfer gas into said conduits; and (c) at least one active air flow control element for actuating movement of said heat transfer gas through said conduits.

18. A method of regulating the thermal characteristics of a self-contained fuel cell apparatus comprising a fuel reformer, said apparatus having external surfaces and a plurality of heat-generating components including the fuel cell and the fuel reformer housed within said apparatus, said components having different preferred operating temperature ranges, said method comprising:

(a) introducing air into said apparatus from the environment surrounding said apparatus;

(b) moving said air within said apparatus in one or more flow paths between said components to maintain said components within said preferred operating temperature ranges, whereby said flow paths are configured such that said air has sufficient cooling capacity at any location within said flow paths to accept waste heat from any of said components located downstream therefrom; and (c) exhausting said air from said apparatus to said environment surrounding said apparatus.

19. The method of claim 18, wherein the temperature of said external surfaces and said air exhausted from said apparatus is maintained below 70° C.

20. The method of claim 18, wherein the temperature of said external surfaces and said air exhausted from said apparatus is maintained below 50° C.

21. The method of claim 18, comprising a plurality of said flow paths and wherein at least some of said flow paths are merged prior to exhausting said air from said apparatus.

22. The method of claim 21, wherein said air is introduced into said apparatus through a single inlet and exhausted from said apparatus from a single outlet, wherein said inlet and said outlet are located on a common one of said external surfaces.

23. The method of claim 18, wherein a first portion of said air is recirculated within said flow paths after it has been heated within said apparatus.

24. The method of claim 23, wherein said first portion of said air is substantially free of reformer exhaust.

* * * * *